United States Patent
Jelinek

(10) Patent No.: US 8,090,246 B2
(45) Date of Patent: Jan. 3, 2012

(54) IMAGE ACQUISITION SYSTEM

(75) Inventor: Jan E. Jelinek, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 426 days.

(21) Appl. No.: 12/188,561

(22) Filed: Aug. 8, 2008

(65) Prior Publication Data

US 2010/0033677 A1 Feb. 11, 2010

(51) Int. Cl.
G03B 29/00 (2006.01)
G03B 17/00 (2006.01)
G03B 3/00 (2006.01)
G03B 13/00 (2006.01)
H04N 5/335 (2006.01)
A61B 3/14 (2006.01)

(52) U.S. Cl. .......... 396/18; 396/80; 396/102; 396/104; 348/296; 348/345; 351/206

(58) Field of Classification Search .......... 396/89, 396/18, 80, 93, 102, 104; 348/296, 345; 351/206

See application file for complete search history.

(56) References Cited

U.S. PATENT DOCUMENTS

| | | |
|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,687,031 A | 11/1997 | Ishihara |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |

(Continued)

FOREIGN PATENT DOCUMENTS

EP 0484076 5/1992

(Continued)

OTHER PUBLICATIONS

Bonney et al., "Iris Pattern Extraction Using Bit Planes and Standard Deviations," IEEE, pp. 582-586, 2004.

(Continued)

*Primary Examiner* — Rochelle-Ann J Blackman

(74) *Attorney, Agent, or Firm* — Seager, Tufte & Wickhem LLC

(57) ABSTRACT

A system having a sensor and variable focus lens for iris image standoff acquisition. The sensor may capture a sequence of images at a high frame rate of a person for getting an eye or an iris in a window within the images. Even if the eye moves around in the image, the window may stay on the eye. During this capture, the focus of the lens may be changed, with a best focus situated somewhere in between the end focus positions of the lens. The sensor may be an infrared (IR) sensor and an IR illuminator or flash may provide light for the capture of images. An intensity variance indicator may be incorporated to select an in-focus image of the sequence. Processing of the images may be subsequent to the capture of images, thus not hindering the frame rate of the system.

19 Claims, 12 Drawing Sheets

U.S. PATENT DOCUMENTS

| | | |
|---|---|---|
| 5,896,174 A | 4/1999 | Nakata |
| 5,901,238 A | 5/1999 | Matsuhita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,259,478 B1 | 7/2001 | Hori |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Shuman et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Illman |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,030,351 B2 | 4/2006 | Wasserman et al. |
| 7,053,948 B2 | 5/2006 | Konishi |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 | 12/2008 | Loy et al. |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |

| | | |
|---|---|---|
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessier |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0204711 A1 | 10/2004 | Jackson |

| | | | | | | |
|---|---|---|---|---|---|---|
| 2004/0219902 | A1 | 11/2004 | Lee et al. | EP | 1139270 | 10/2001 |
| 2004/0233038 | A1 | 11/2004 | Beenau et al. | EP | 1237117 | 9/2002 |
| 2004/0252866 | A1 | 12/2004 | Tisse et al. | EP | 1477925 | 11/2004 |
| 2004/0255168 | A1 | 12/2004 | Murashita et al. | EP | 1635307 | 3/2006 |
| 2005/0008200 | A1 | 1/2005 | Azuma et al. | GB | 2369205 | 5/2002 |
| 2005/0008201 | A1 | 1/2005 | Lee et al. | GB | 2371396 | 7/2002 |
| 2005/0012817 | A1 | 1/2005 | Hampapur et al. | GB | 2375913 | 11/2002 |
| 2005/0029353 | A1 | 2/2005 | Isemura et al. | GB | 2402840 | 12/2004 |
| 2005/0052566 | A1 | 3/2005 | Kato | GB | 2411980 | 9/2005 |
| 2005/0055582 | A1 | 3/2005 | Bazakos et al. | JP | 9161135 | 6/1997 |
| 2005/0063567 | A1 | 3/2005 | Saitoh et al. | JP | 9198545 | 7/1997 |
| 2005/0084137 | A1 | 4/2005 | Kim et al. | JP | 9201348 | 8/1997 |
| 2005/0084179 | A1 | 4/2005 | Hanna et al. | JP | 9147233 | 9/1997 |
| 2005/0099288 | A1 | 5/2005 | Spitz et al. | JP | 9234264 | 9/1997 |
| 2005/0102502 | A1 | 5/2005 | Sagen | JP | 9305765 | 11/1997 |
| 2005/0110610 | A1 | 5/2005 | Bazakos et al. | JP | 9319927 | 12/1997 |
| 2005/0125258 | A1 | 6/2005 | Yellin et al. | JP | 10021392 | 1/1998 |
| 2005/0127161 | A1 | 6/2005 | Smith et al. | JP | 10040386 | 2/1998 |
| 2005/0129286 | A1 | 6/2005 | Hekimian | JP | 10049728 | 2/1998 |
| 2005/0134796 | A1 | 6/2005 | Zelvin et al. | JP | 10137219 | 5/1998 |
| 2005/0138385 | A1 | 6/2005 | Friedli et al. | JP | 10137221 | 5/1998 |
| 2005/0138387 | A1 | 6/2005 | Lam et al. | JP | 10137222 | 5/1998 |
| 2005/0146640 | A1 | 7/2005 | Shibata | JP | 10137223 | 5/1998 |
| 2005/0151620 | A1 | 7/2005 | Neumann | JP | 10248827 | 9/1998 |
| 2005/0152583 | A1 | 7/2005 | Kondo et al. | JP | 10269183 | 10/1998 |
| 2005/0193212 | A1 | 9/2005 | Yuhara | JP | 11047117 | 2/1999 |
| 2005/0199708 | A1 | 9/2005 | Friedman | JP | 11089820 | 4/1999 |
| 2005/0206501 | A1 | 9/2005 | Farhat | JP | 11200684 | 7/1999 |
| 2005/0206502 | A1 | 9/2005 | Bernitz | JP | 11203478 | 7/1999 |
| 2005/0207614 | A1 | 9/2005 | Schonberg et al. | JP | 11213047 | 8/1999 |
| 2005/0210267 | A1 | 9/2005 | Sugano et al. | JP | 11339037 | 12/1999 |
| 2005/0210270 | A1 | 9/2005 | Rohatgi et al. | JP | 2000005149 | 1/2000 |
| 2005/0210271 | A1 | 9/2005 | Chou et al. | JP | 2000005150 | 1/2000 |
| 2005/0238214 | A1 | 10/2005 | Matsuda et al. | JP | 2000011163 | 1/2000 |
| 2005/0240778 | A1 | 10/2005 | Saito | JP | 2000023946 | 1/2000 |
| 2005/0248725 | A1 | 11/2005 | Ikoma et al. | JP | 2000083930 | 3/2000 |
| 2005/0249385 | A1 | 11/2005 | Kondo et al. | JP | 2000102510 | 4/2000 |
| 2005/0255840 | A1 | 11/2005 | Markham | JP | 2000102524 | 4/2000 |
| 2006/0093190 | A1 | 5/2006 | Cheng et al. | JP | 2000105830 | 4/2000 |
| 2006/0147094 | A1 | 7/2006 | Yoo | JP | 2000107156 | 4/2000 |
| 2006/0165266 | A1 | 7/2006 | Hamza | JP | 2000139878 | 5/2000 |
| 2006/0274919 | A1 | 12/2006 | LoIacono et al. | JP | 2000155863 | 6/2000 |
| 2007/0036397 | A1 | 2/2007 | Hamza | JP | 2000182050 | 6/2000 |
| 2007/0140531 | A1 | 6/2007 | Hamza | JP | 2000185031 | 7/2000 |
| 2007/0160266 | A1 | 7/2007 | Jones et al. | JP | 2000194972 | 7/2000 |
| 2007/0189582 | A1 | 8/2007 | Hamza et al. | JP | 2000237167 | 9/2000 |
| 2007/0206840 | A1 | 9/2007 | Jacobson | JP | 2000242788 | 9/2000 |
| 2007/0211924 | A1 | 9/2007 | Hamza | JP | 2000259817 | 9/2000 |
| 2007/0274570 | A1 | 11/2007 | Hamza | JP | 2000356059 | 12/2000 |
| 2007/0274571 | A1 | 11/2007 | Hamza | JP | 2000357232 | 12/2000 |
| 2007/0286590 | A1 | 12/2007 | Terashima | JP | 2001005948 | 1/2001 |
| 2008/0005578 | A1 | 1/2008 | Shafir | JP | 2001067399 | 3/2001 |
| 2008/0075334 | A1 | 3/2008 | Determan et al. | JP | 2001101429 | 4/2001 |
| 2008/0075441 | A1 | 3/2008 | Jelinek et al. | JP | 2001167275 | 6/2001 |
| 2008/0075445 | A1 | 3/2008 | Whillock et al. | JP | 2001222661 | 8/2001 |
| 2008/0104415 | A1 | 5/2008 | Palti-Wasserman et al. | JP | 2001292981 | 10/2001 |
| 2008/0148030 | A1 | 6/2008 | Goffin | JP | 2001297177 | 10/2001 |
| 2008/0211347 | A1 | 9/2008 | Wright et al. | JP | 2001358987 | 12/2001 |
| 2008/0252412 | A1 | 10/2008 | Larsson et al. | JP | 2002119477 | 4/2002 |
| 2009/0046899 | A1 | 2/2009 | Northcott et al. | JP | 2002133415 | 5/2002 |
| 2009/0092283 | A1 | 4/2009 | Whillock et al. | JP | 2002153444 | 5/2002 |
| 2009/0316993 | A1 | 12/2009 | Brasnett et al. | JP | 2002153445 | 5/2002 |
| 2010/0034529 | A1 | 2/2010 | Jelinek | JP | 2002260071 | 9/2002 |
| 2010/0142765 | A1 | 6/2010 | Hamza | JP | 2002271689 | 9/2002 |
| 2010/0182440 | A1 | 7/2010 | McCloskey | JP | 2002286650 | 10/2002 |
| 2010/0239119 | A1 | 9/2010 | Bazakos et al. | JP | 2002312772 | 10/2002 |
| | | | | JP | 2002329204 | 11/2002 |
| | FOREIGN PATENT DOCUMENTS | | | JP | 2003006628 | 1/2003 |
| | | | | JP | 2003036434 | 2/2003 |
| EP | 0593386 | 4/1994 | | JP | 2003108720 | 4/2003 |
| EP | 0878780 | 11/1998 | | JP | 2003108983 | 4/2003 |
| EP | 0899680 | 3/1999 | | JP | 2003132355 | 5/2003 |
| EP | 0910986 | 4/1999 | | JP | 2003150942 | 5/2003 |
| EP | 0962894 | 12/1999 | | JP | 2003153880 | 5/2003 |
| EP | 1018297 | 7/2000 | | JP | 2003242125 | 8/2003 |
| EP | 1024463 | 8/2000 | | JP | 2003271565 | 9/2003 |
| EP | 1028398 | 8/2000 | | JP | 2003271940 | 9/2003 |
| EP | 1041506 | 10/2000 | | JP | 2003308522 | 10/2003 |
| EP | 1041523 | 10/2000 | | JP | 2003308523 | 10/2003 |
| EP | 1126403 | 8/2001 | | | | |

| | | |
|---|---|---|
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | 2005093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | 2008031089 | 3/2008 |
| WO | 2008040026 | 4/2008 |

OTHER PUBLICATIONS

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. Of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.
AOptix Technologies, "Introducing the AOptix InSight 2 Meter Iris Recognition System," 6 pages, 2010.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modem Tracking Systems, Artech House, pp. 595-659, 1999.
Brasnett et al., "A Robust Visual Identifier Using the Trace Transform," 6 pages, prior to Jun. 11, 2010.
Buades et al., "A Review of Image Denoising Algorithms, with a New One," Multiscale Modeling & Simulation, vol. 4, No. 2, pp. 490-530, 2005.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792 498, filed Jun. 2, 2010.
U.S. Appl. No. 12/814,232, filed Jun. 11, 2010.
U.S. Appl. No. 12/814,272, filed Jun. 11, 2010.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Society Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
Ivins et al., "A Deformable Model of the Human Iris for Measuring Small Three-Dimensional Eye Movements," Machine Vision and Applications, vol. 11, pp. 42-51, 1998.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Local Intensity Variation Analysis for Iris Recognition," Pattern Recognition, vol. 37, pp. 1287-1298, 2004.
Ma et al., "Video Sequence Querying Using Clustering of Objects' Appearance Models," Advances in Visual Computing Third Annual Symposium, ISVC 2007, 14 pages, 2007.
Monro et al., "DCT-Based Iris Recognition," IEEE Transactions on Pattern Analysis and Machine Intelligence, vol. 29, No. 4, Apr. 2007.
Noh et al., "A Novel Method to Extract Features for Iris Recognition System," AVBPA 2003, LNCS 2688, pp. 862-868, 2003.
Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.
Pamudurthy et al., "Dynamic Approach for Face Recognition Using Digital Image Skin Correlation," Audio and Video Based Person Authentication 5$^{th}$ International Conference, AVBPA 2005, Hilton Rye Town, NY, USA, 11 pages, Jul. 20-22, 2005.
Petrou et al., "The Trace Transform in a Nutshell," 9 pages, prior to Jun. 11, 2010.
Phillips et al., "FRVT 2006 and ICE 2006 Large-Scale Results," 56 pages, Mar. 2007.
Porikli et al., "Covariance Tracking Using Model Update Based on Means on Riemannian Manifolds," 8 pages, prior to Jun. 11, 2010.
Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.
Ross et al., "Segmenting Non-Ideal Irises Using Geodesic Active Contours," IEEE 2006 Biometrics Symposium, 3 pages, 2006.
Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun Et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics.org/ole, 2 pages, Jan. 2009.

http://www.imagine-eyes.com/content/view/100/1151, "INOVEO—Ultra-High Resolution Retinal Imaging with Adaptive Optics," 2 pages, printed Feb. 22, 2010.

IMAGE ACQUISITION SYSTEM

BACKGROUND

The invention pertains to biometrics and particularly to acquisition of biometric images.

SUMMARY

The invention is an image standoff acquisition system for capturing images of an eye or eyes of a non-cooperating subject. The invention may overcome a need for exact focusing by capturing a rapid sequence of frames while sweeping through the focus range of optics of an acquisition system or camera. The focus range may be effected with moving the lens, the subject, the camera, the image sensor in the camera, or a combination of two or more items. After the sequence is captured, then a frame of the sequence having an iris most in focus may be selected.

DESCRIPTION

Figure 1:
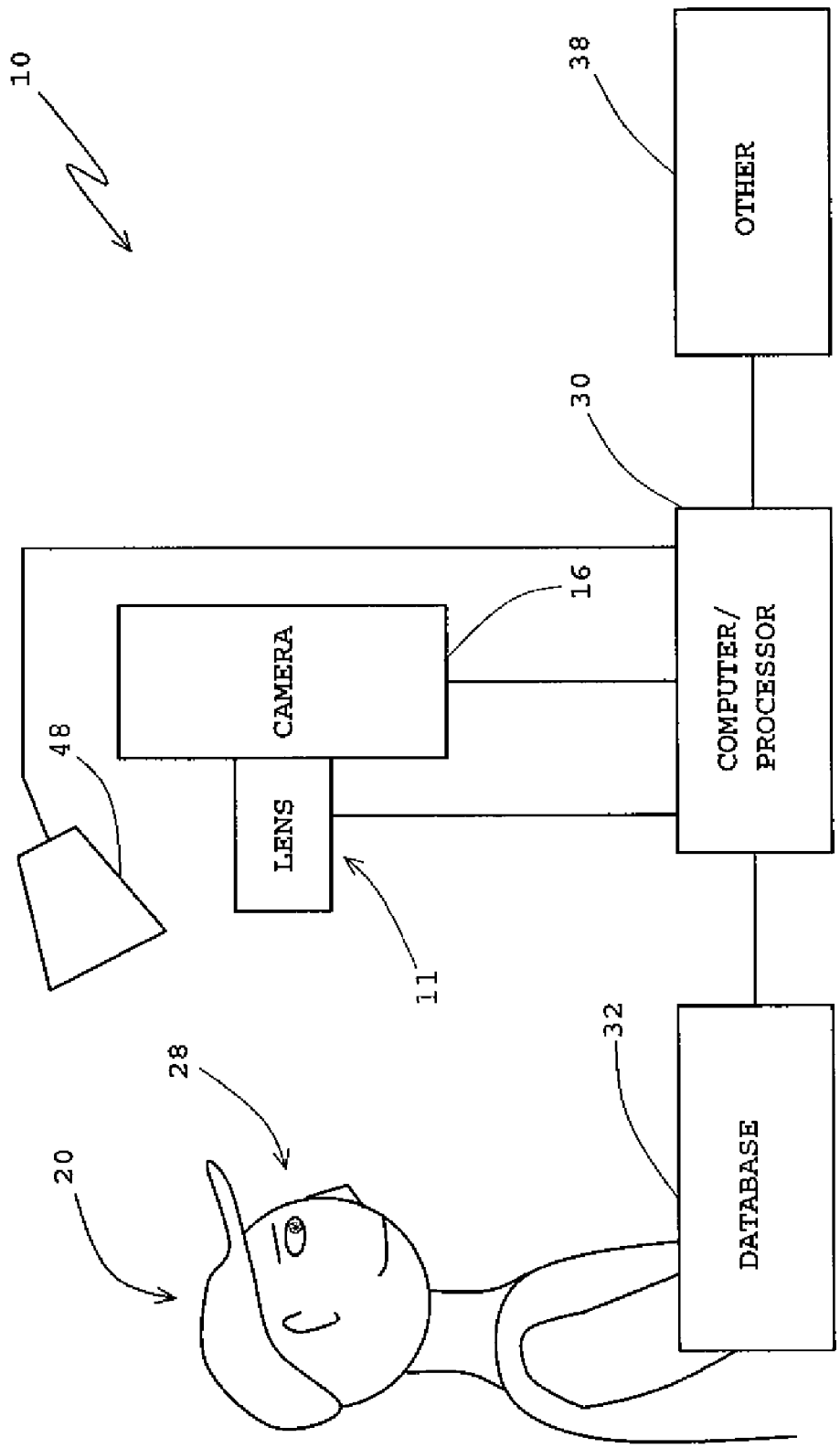
FIG. 1 is a block diagram of an image acquisition system.

Iris patterns may contain many very small details that need to be correctly recorded for analysis and identification. Capturing those details may require an optical system with a very large spatial frequency bandwidth. Such system may have very sensitive focusing in that its depth of field can be as low as a fraction of a millimeter. Given the depth profile of a human face, a high quality system cannot necessarily be focused on it in its entirety. The system may need to find within a frame the eye to be imaged and then focus on it. The focusing should be very precise. It is this requirement that makes many current systems so user unfriendly, because in order to lower their engineering complexity and thus cost, the systems shift the burden onto the subject in hope that the subject's cooperation will eventually result in a well focused iris image. To obtain a well focused iris image, the subject may be commanded to move back and forth, left to right, and so on, until the subject eventually positions its eye into the system's sweet spot. Experience shows that it may require much patience and willingness to cooperate by the subject. Alternatively, handheld devices like those used in the military need to be moved by the user to get the eye into a crosshair and achieve focus. If the user is not well trained or works under stress, capturing a good image may again become a time consuming challenge. Since the amount of iris details needed to be captured may depend on an intended security level, in that the higher the security level, the more precise solution is required to capture adequate images.

In an iris image acquisition system, the optics alone is not necessarily the costliest part. Cost may be primarily and progressively driven by the degree of subject's lack of cooperation and the user's lack of skill which the system can tolerate and still work reliably. The present system may address these issues of cooperation and skill in a way that requires neither optical autofocusing nor precise range finding.

Until recently, cameras offered not really very large image sizes and had low frame rates. The present system may build upon recent advances such as large image sizes and high frame rates. Other technologies may be incorporated.

The system may have a camera that takes a fast sequence of frames while the optical focus lens position is incremented or varied so that each frame is taken with a somewhat different focus adjustment. The focus lens position may execute a full sweep of its adjustability range, very much like if one turns the focus ring on a classical camera lens objective from end to end, i.e., from a focus at infinity to a focus at the nearest working distance of the objective, while shooting pictures in a rapid succession during the turn of the focus ring.

There may be the stop-and-go approach, when in each iteration, the system first resets the lens' focus and then takes a shot. There may be the continuous approach, when for instance, four or so shots are taken while the focus lens is moving, without stopping during the image acquisition. For this "continuous focus lens sweep" to work well, the image exposure time ($T_E$) should be shorter than the time ($T_F$) it takes the lens to get out of its depth of field.

Once the sequence has been captured, each frame may eventually be checked to note if the subject of the camera is at least approximately in focus by measuring its contrast or, in a more detailed way, spatial frequency content in a number of small patches selected in the frame post-processing. Patch selection may follow a predefined pattern or it may be random. A first check of the frames may result in discarding most of the images in the sequence for being very much out of focus. The selection may be done after the sequence has been taken but it could be done in real time though the latter processing or autofocusing could be more costly.

A significant aspect is that the frames which survive a first pass will be analyzed further to locate one or two eyes of a person in them, and then the spatial frequency content will be measured over the eyes only. Eye finding may be generated by an algorithm. The eye in the image or images may be localized to and followed by a window. Such window may be described herein relative to FIGS. 3, 4 and 10. The frames having the highest spatial frequency content over the eyes in them may then be the best eye and/or iris images in the sequence, and be either in or nearly in focus.

The rate at which the frames are to be taken, may define a minimum degree of cooperation required from the subject. If the subject is not moving, holding its head more or less steady, and is reasonably close to the camera, then frame rates on the order of hundreds of frames per second may suffice, without a need for very high illumination iradiance levels which may be harmful to the subject's eyes. Near IR flash may be used which may be increased with intensity at farther distances or shorter exposure times.

The frame sequence may be processed either offline or in real time, depending on the investment one is willing to make in the necessary computational hardware for the present system. Another approach may include culling out the unlikely candidate frames in real time, storing only those with promise, and analyzing them off-line after the entire focus sweep sequence is completed. Off-line processing of the frames may be done within the system in a second or so.

The system may have preset focusing prior to image capturing, whether it be either manual focusing done through manipulating the mutual position between the subject and the device, or focusing based on a distance or focus mechanism and then setting the focus back 100 mm, for instance, or so behind the subject or a focus sweet spot for image acquisition, such as an iris being coincident with the camera optics object plane.

The system may have a focus lens suitably instrumented with a motor drive. During frame capture, the focus lens position may sweep an entire focus range in either continuous motion or discrete steps. In the latter case, frame grabbing may be synchronized so that a frame is taken when the lens stops at each consecutive step of a series of steps. A camera may have a fixed focus and the camera moves instead or the subject is asked to step forward or backward, or the sensor in the camera may be moved.

Measuring a quality of focus may rely on measuring image intensity variance over a patch, or rely on approaches based on spectral analysis. The measuring may be done off-line. For example, the variance value changing from one image to the next image may indicate whether the images examined are moving toward or away from the focus. The system is not limited to a particular approach of focus quality measurements or certain algorithms for face and eye finding.

FIG. 1 is a diagram of, for example, an iris image standoff acquisition system 10. The system may include an optics assembly 11 having an adjustable focus for capturing eye 28 details of a subject 20. Alternatively, an adjustable focus may be achieved by moving the camera sensor to and from the subject, moving the camera to and from the subject, or having the subject move to and from the camera. The assembly 11 may be optically coupled to a camera 16. There may be an illuminator 48 in case of a need for added light or a flash for obtaining a fast image take of the subject. The focus of assembly 11 may be adjusted with a signal from a computer/processor 30 (referred to herein as a computer). Shutter control, and imagery capture and receipt may be managed by the computer 30. Computer 30 may be a PC or other equivalent device. It may contain software appropriate for effecting standoff image acquisition of an iris. Computer 30 may be connected to a database 32, a network, enforcement agency data center, an immigration processing center, and/or so on, the latter items of which are shown as "other" 38 in FIG. 1.

Figure 2:
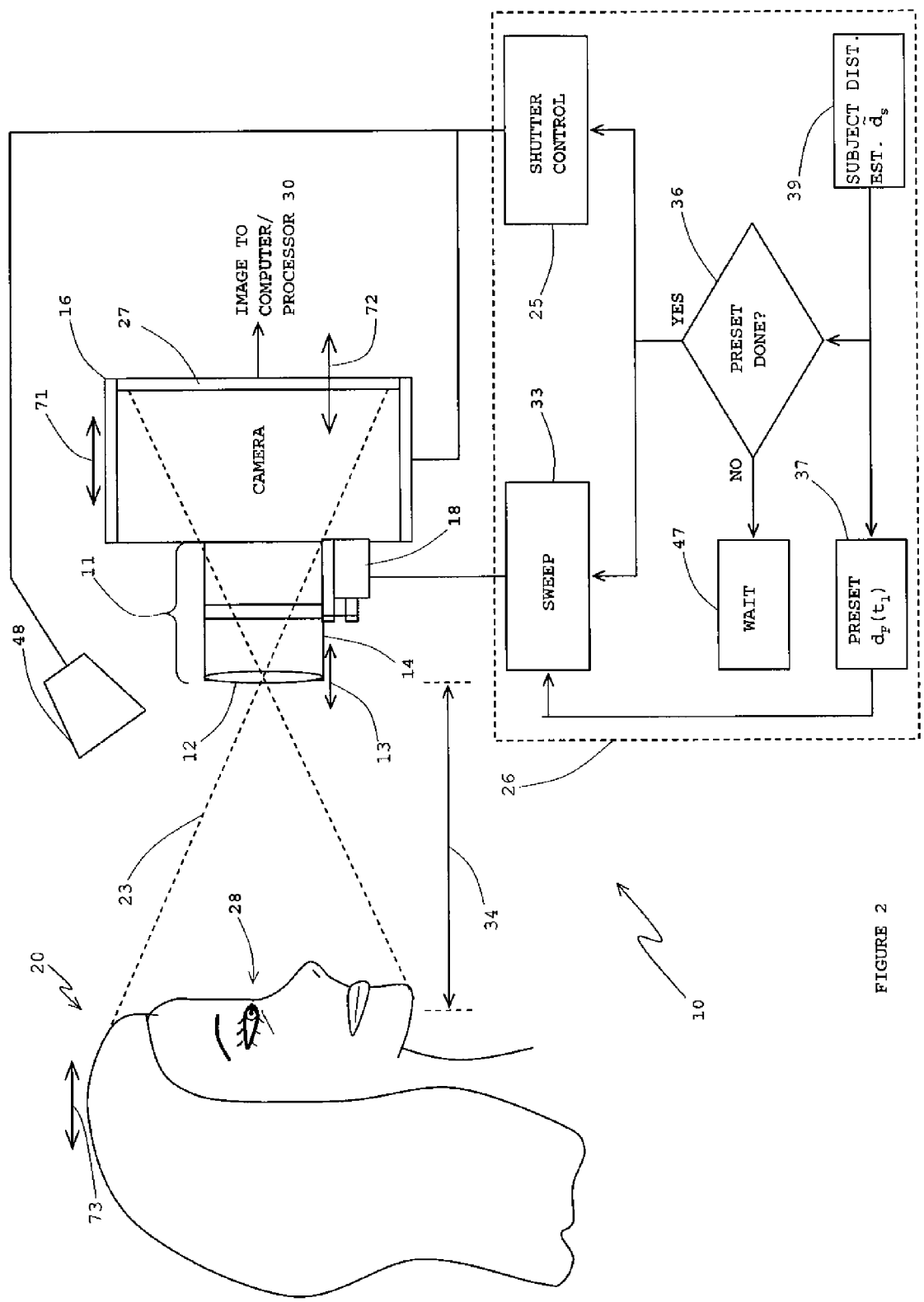
FIG. 2 is a more detailed diagram of the image acquisition system.

FIG. 2 is a diagram of an illustrative example of the iris image standoff acquisition system 10. Focus of the subject may be achieved in several ways. One way is to have the subject 20 move across the focusing distance 34 of the camera 16 as indicated by motion arrow 73. Another way is to move the camera 16 across the focusing distance 34 as indicated by motion arrow 71. Another way is to move the sensor 27 across the focusing distance 34 as indicated by motion arrow 72. Still another way is to move the lens 12 across the focusing distance 34 as indicated by motion arrow 13. In each of the indicated ways of moving across the focusing distance 34, the other ways are held still in that just one item is moved.

Moving across the focusing distance 34 indicates that the movement begins at one side of the distance 34 and ends up on the other side of the focusing distance 34. During movement across the focusing distance for each of these ways, a sequence of images may be captured at a fast rate. Each of the movements may be "continuous" or "stop and go".

For illustrative purposes, the way of moving the lens 12 across the focusing distance 34 may be example for description herein. The optics assembly 11 of FIG. 2 may have a lens 12 which may be moved back and forth in direction 13 with a housing 14 for holding the lens which may be used for focusing an image of subject 20 or a portion of it on a sensor array 27. The lens 12 or sensor array 27 may be moved with a motor, a drive or mover mechanism 18 which may be connected to housing 14. The lens housing 14 may be moved in a continuous mode resulting in a "continuous focus sweep" approach, or in a step mode resulting in a "stop-and-go" approach having focusing increments.

In the "stop-and-go" approach, at each stop, the lens focus maybe set and then a picture is taken and detected at sensor array 27 in camera 16. The lens 12 may be set again for another focus at the next step and then a picture is taken and so on. The optics assembly 11 may contain one or more lenses.

In the continuous approach, a sequence of images or pictures may be taken while the lens housing 14 is moving. The focusing of lens 12 does not necessarily stop during image acquisition or picture taking. Relative to the "continuous focus lens sweep" approach, image or picture exposure time should be shorter than the time it takes the lens to get out of its depth of field. Light 23 from subject 20 may be conveyed through lens 12 of lens housing 14, and into camera 16 onto array 27.

A mechanical or electronic shutter may be controlled with a signal from a shutter control 25 of a subsystem 26 which may be a part of the computer 30. The shutter may be electronically controlled, or may in effect be a picking off or an electronically receiving an image from sensor array 27 for a specified duration as desired. The exposure time of the image sensor for an image may be less than 100 milliseconds. In some instances, it may be less than 10 milliseconds or even less than 2 milliseconds, depending on the design of the system. The shutter may be in effect an illuminator 48 or other non-mechanical type of device. Alternatively, the shutter could be a mechanical mechanism.

There might be no explicit shutter as such in system 10. The image capture or acquisition may occur during a time of a flash or a constant supplemental illumination, such as LED sources, to assist in image exposure or capture. During no-flash time, an image sensor may be set, configured or designed not to detect any light. There may be a threshold which a light intensity, whether IR or visible, has to reach before the camera sensor 27 will sense and capture an image projected to it. The duration of the illumination or flash, particularly relative to sensor 27, may be equivalent to the speed of a shutter opening. For instance, system 10 may have an IR illuminator or flash 48 which may provide a basis for a short duration exposure of an image on the sensor 27. The IR illuminator 48 may be of a wavelength which is not readily visible to but may have some effect on the subject 20 such as a person. There may also be a visible light illuminator in place of having an intensity which may be inconspicuous to the person targeted by system 10.

IR flash or illuminator 48 may be electronically controlled by a shutter signal from shutter control 25. Alternatively, sensor 27 may capture or acquire an image by being electronically controlled in terms of the amount of time the sensor is allowed to be sensitive to light from the subject. Such sensor control may emulate a shutter effect. Camera 16 may monitor subject 20 and its eye or eyes 28 for purposes of aiming, focusing and capturing an image of the subject. The focusing change of lens 12 may be provided by a sweep signal from a module 33 to the drive or mover mechanism 18. An input to module 33 may be a "preset done" signal from a preset module 36 which occurs when a preset signal from a module 37 indicating an object plane or focusing distance ($d_F$) 34 for an initial time ($t_1$) of a start of a sequence of images to be captured of subject 20. The preset signal ($d_F(t_1)$) of module 37 may be based on an estimate of the distance 34 between the subject 20 and camera 16. A point of distance 34 measurement from camera 16 may be lens 12 or some other item of the camera 16 arrangement. A module 39 may provide a signal of the distance 34 estimate $\tilde{d}_s$ to preset module 37. The signal from module 39 may also go to a decision item represented by a symbol 36 which asks the question whether the preset has been done. This signal indicates that the preset has been done and a "yes" signal may go to the sweep module 33 and the shutter control module 25 for a go-ahead of the sweep and shutter control to begin. If the signal from module 39 has not been received by preset module 37 and the decision item at symbol 36, then a "no" signal may go to a "wait" module 47 which means that modules 25 and 33 should wait until such signal has been sent before starting.

Figure 3:
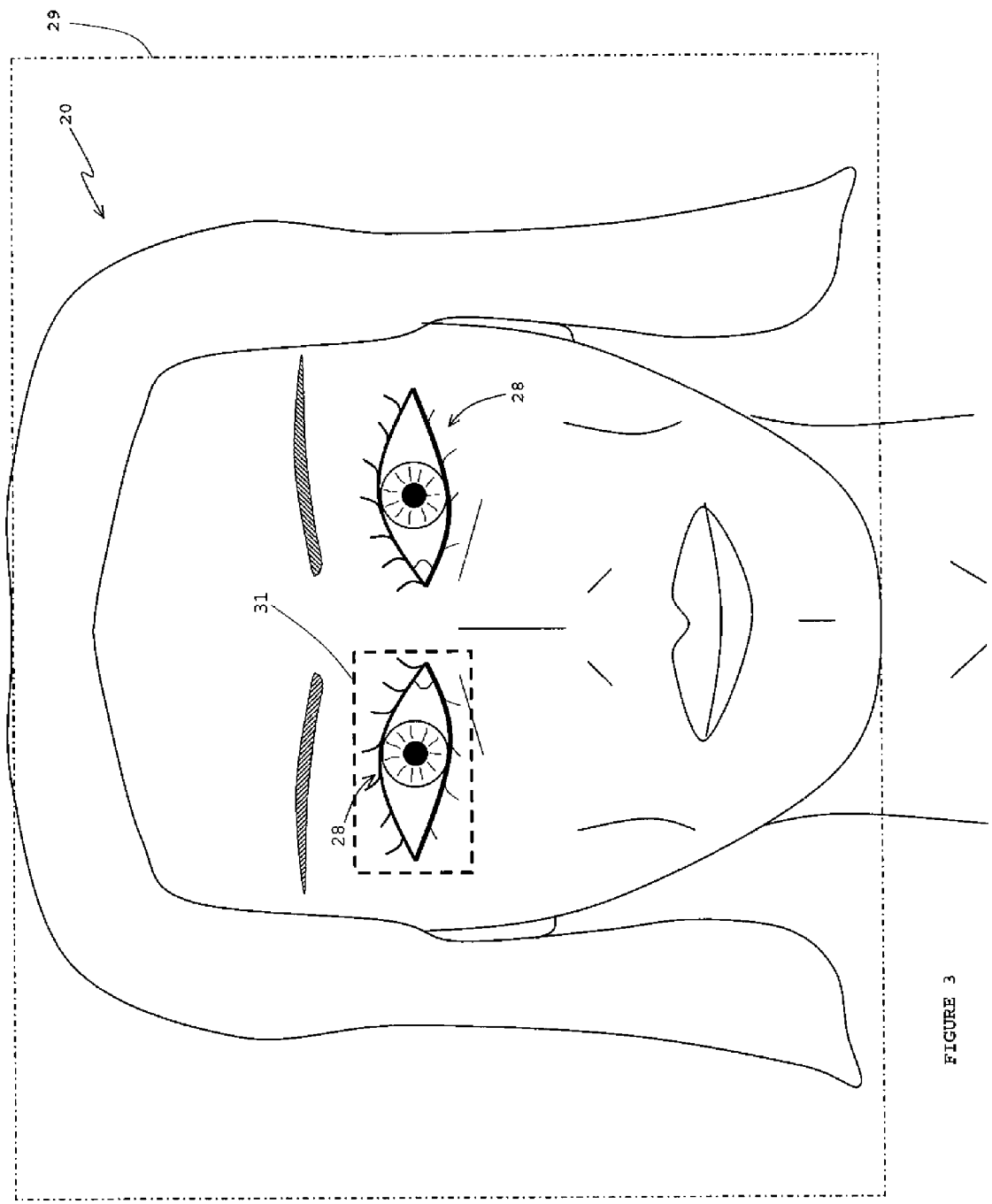
FIG. 3 is a diagram of an example image on a camera sensor.
Figure 4:
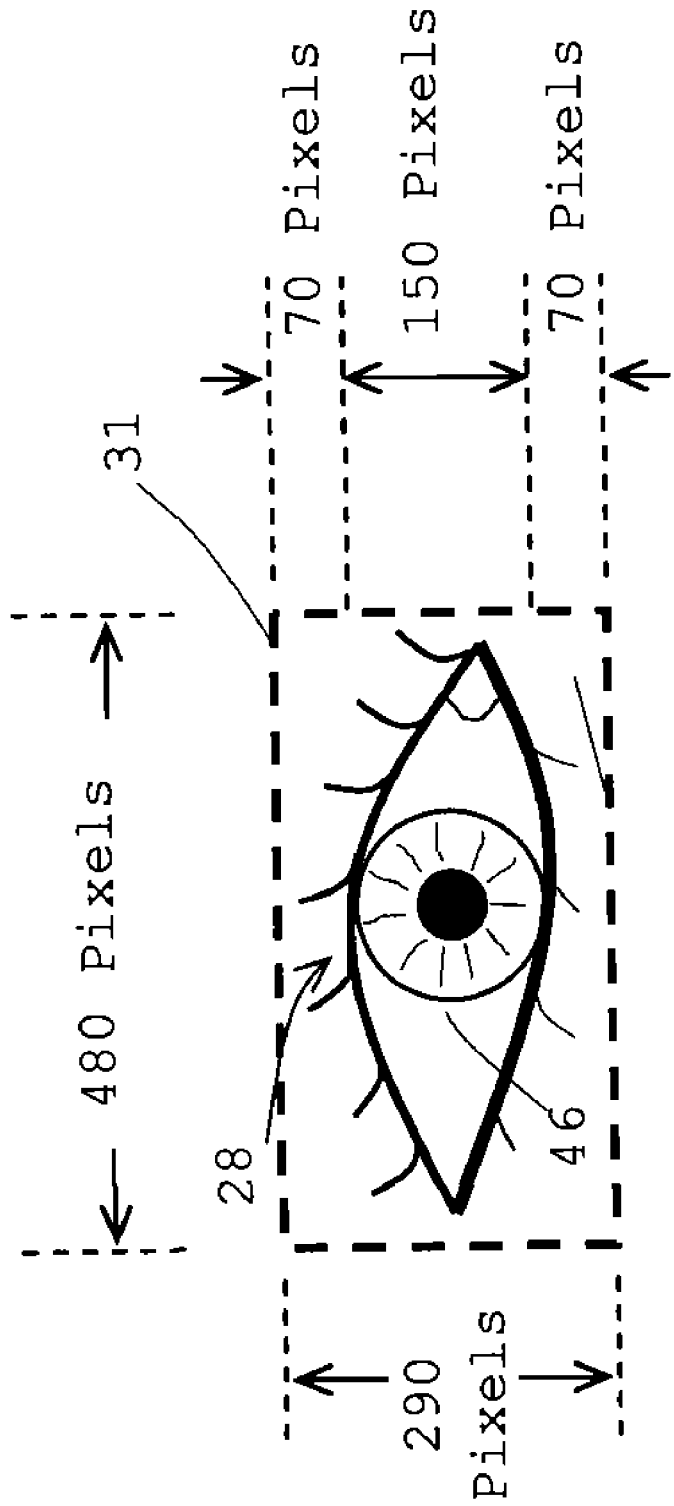
FIG. 4 is a diagram of a window on an eye of an image of a subject.

FIG. 3 shows an image 29 of subject 20 on sensor 27. Image 29 may be forwarded on to computer 30. Sensor 27 may be, for example, a 2560 by 1920 pixel array providing about 4.9 mega-pixels of imagery of the subject. A window or portion 31 of a target or an area of interest may be extracted from image 29. It may be a VGA format with a pixel size image of 640 by 480 pixels, or be some other size such as 480 by 290 pixels as used in the present example. An eye 28 of the subject or person may be the target to be extracted with window 31. Eye finding software may be used here in conjunction with the window. The window covers a portion of the camera's field of view which should include the target, e.g., eye or iris, in full but need not be much larger than required for better overall accurate focusing on the target (i.e., eye 28). Having the larger image 29 of subject 20, the pointing or aiming of the camera 16 is not necessarily so critical. Further, there may a significant aiming or pointing error tolerance of system 10. A diagram of window 31 is shown in FIG. 4. About 150 pixels may be allowed for a diameter of an iris 46 of eye 28. The iris may be somewhat centered in window 31 as shown by the pixel dimensions. However, it need not necessarily be centered. Also, window 31 may have other pixel dimensions. The dimensions may be adjustable.

Figure 5:
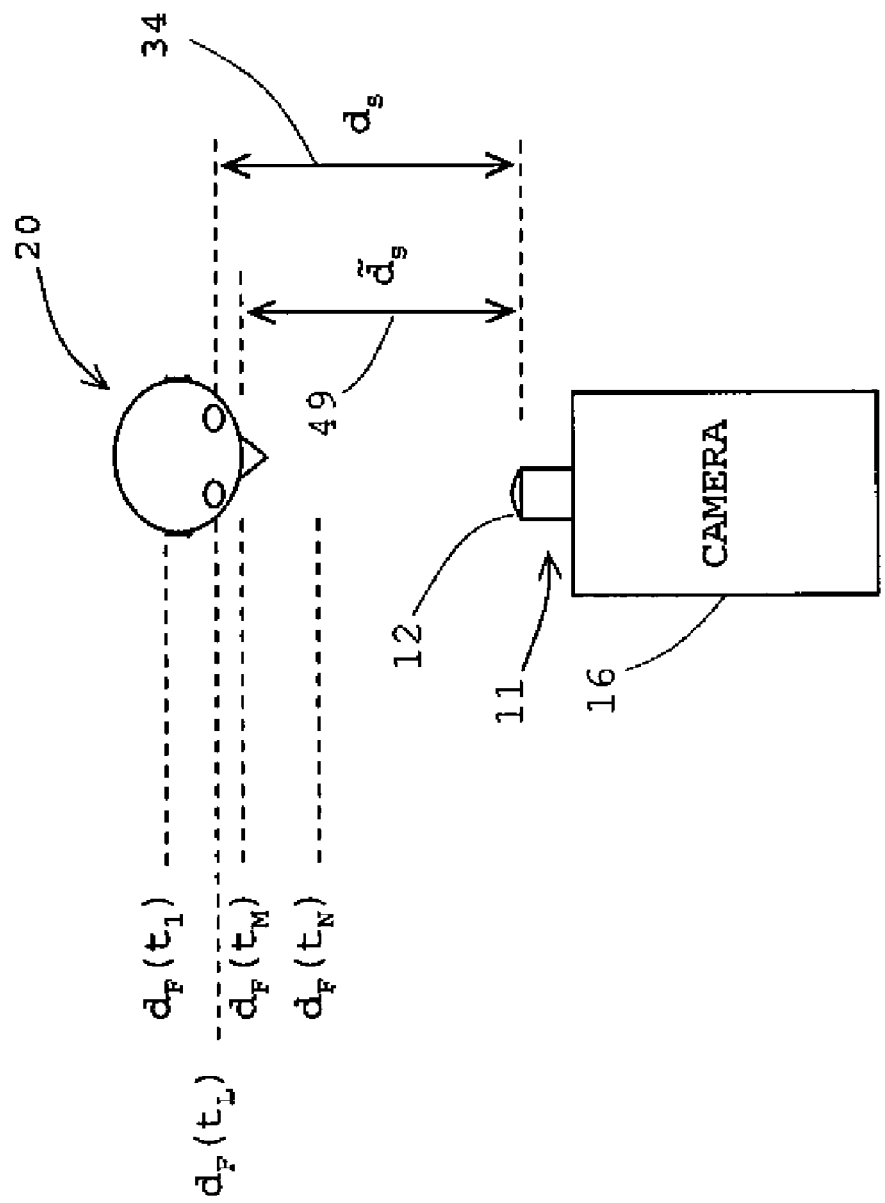
FIG. 5 is a diagram showing focus distances between an acquisition camera and a subject.
Figure 5A:
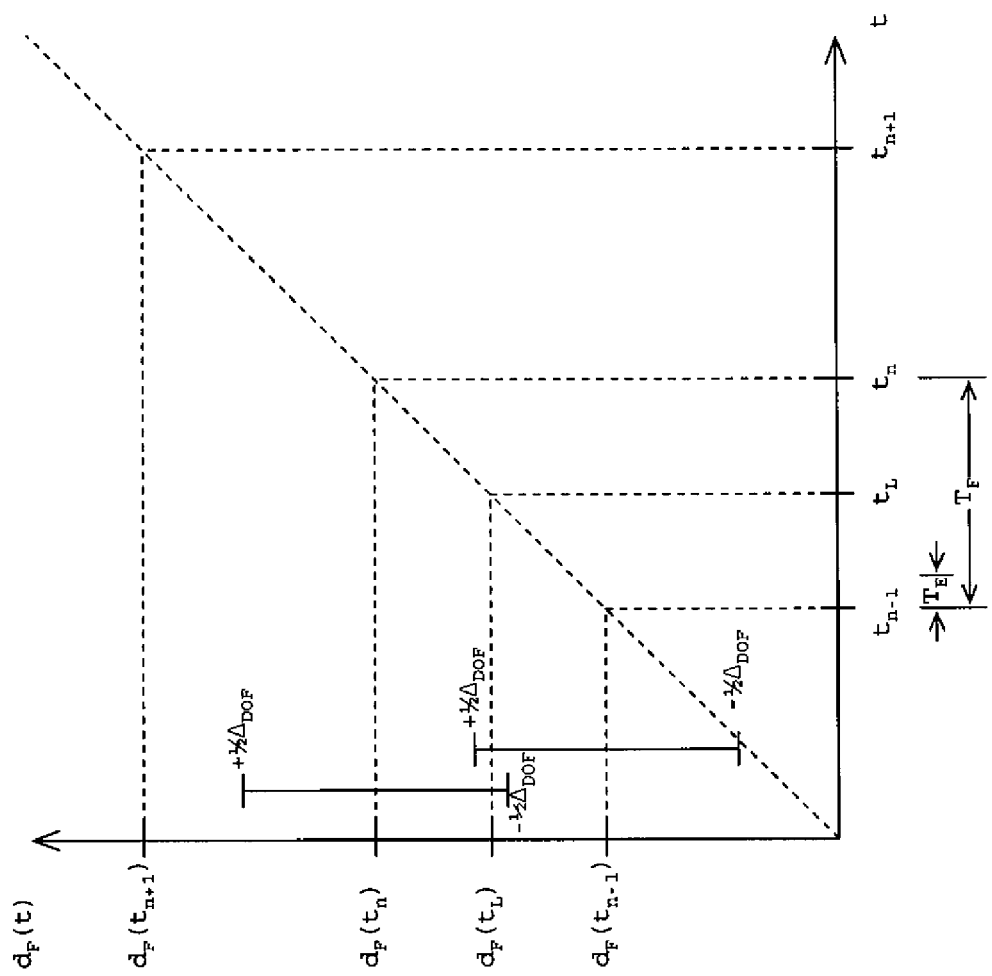
FIG. 5a is a graph showing the nominal focus distance versus time.

FIG. 5 is a diagram of an estimate $\tilde{d}_s$ 49 of actual distance 34 between subject 20 and camera 16, e.g., lens 16. The estimate 49 of the distance, $d_s$ 34, may be more or less than actual distance 34. For an illustrative example, the estimate 49 may be less than distance 34. When an estimate is received by the preset module 37 and forwarded on to the sweep module 33, the focusing distance of lens 12 for camera 16 may be set at a distance behind the estimated distance 49 for the initial start of focusing and taking images of the subject 20. The initial focusing distance may be about 100 mm (or other distance) behind the estimated distance 49, and be designated as $d_F(t_1)$ in FIG. 5. The distance at the other end of the focusing range may be about 100 mm or so ahead of the estimated distance 49, and designated as $d_F(t_N)$, where N may indicate the number of frame periods, or frame shots taken $t_F$ milliseconds apart, or it may be the last unit of N units of time for the focus sweep, whether continuous or discrete, of the subject by lens 12 of optics assembly 11. Starting at time $t_1$, the frames are taken periodically at times $t_1, t_2, t_3, \ldots$ through $t_N$. Somewhere in the course of the focus sweep between $t_1$ and $t_N$, say at $t_L$, the focusing distance $d_F(t_L)$ equals the actual distance 34. FIG. 5a shows a graph of the nominal focus distance "$d_F(t)$" with the plus/minus delta distance of focus "$+/-\frac{1}{2}\Delta_{DOF}$" versus time "t". In the Figure, $t_L$ is intentionally chosen so that $d_F(t_L)$ happens to fall within the depth of the field $+/-\Delta_{DOF}$ of both the (n-1)th and nth frames. In more typical cases, however, the iris will be found in focus in just one frame.

Figure 6:
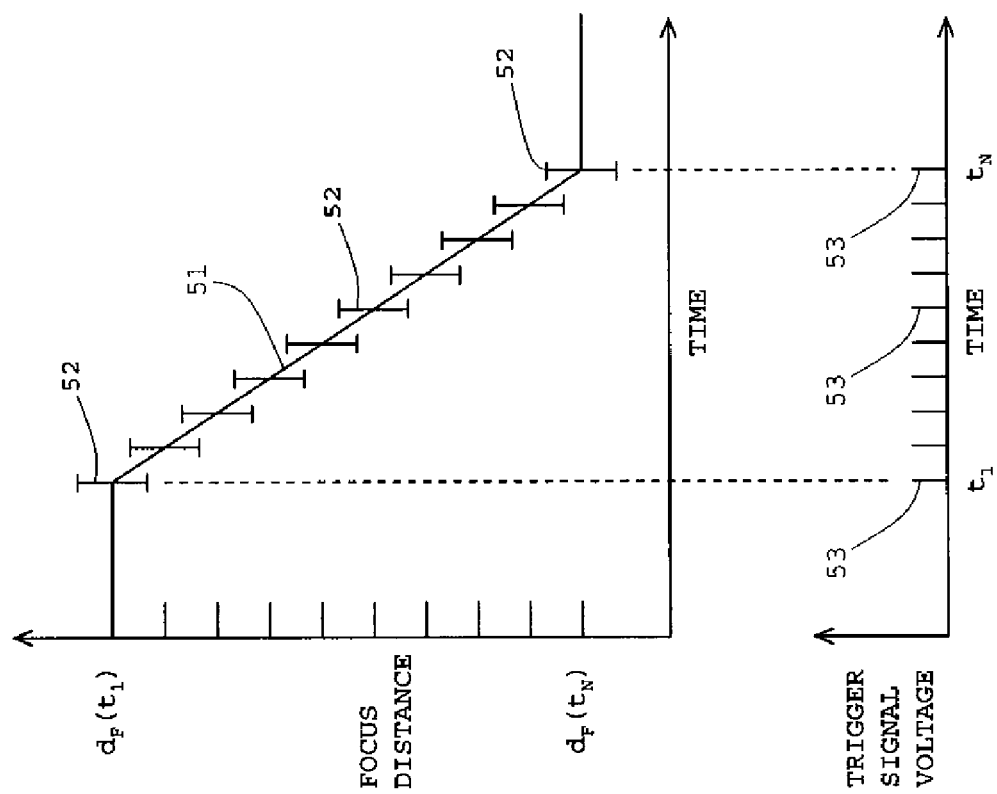
FIG. 6 is a graph showing focusing distance versus time, and trigger signal voltage for image acquisition.

FIG. 6 illustrates graphically focusing distance $d_F$ between the camera 16 or its lens 12 and subject 20, particularly an eye or eyes 28, and more particularly an iris or irises 46 of the eyes, over a number of time increments t, as shown by line 51. In the graphs of FIG. 6, there are about ten instances 52 of time through the range of focusing at which an image of subject 20 may be captured. There could be more or less than ten instances. At each instance of time 52, a trigger signal voltage 53 may go from shutter control module 25 to camera 16 for the shutter or other mechanism to initiate a capture or acquisition of an image of subject 20. At one of these instances of time 52, an image of an iris 46 of at least one eye 28 of subject 20 may be captured on array 27 at an in-focus distance relative to the subject 20 and camera 16.

Figure 7:
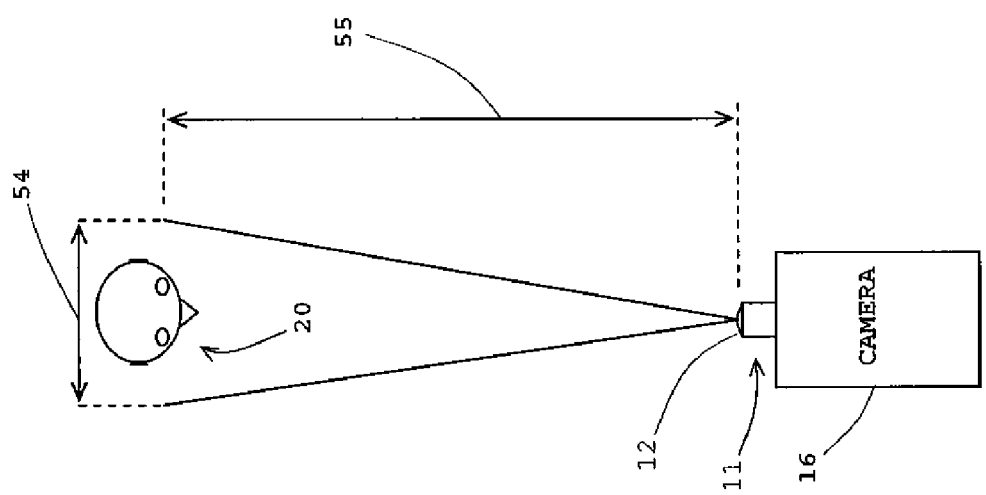
FIG. 7 is a diagram illustrating lateral and radial movement of a subject relative to an acquisition camera.

Movement of subject 20, as illustrated in FIG. 7, is not an intended aspect of the present system 10. Even though subject 20 may have some inadvertent movement, it typically is not critical for obtaining a good focus of the subject. Lateral movement 54 of subject 20 does not necessarily affect the focus distance of the subject from the camera 16, unless it is particularly large. This movement may be arrested by choosing short exposure time. The present system may address radial or forward/backward movement 55 through appropriately choosing the frame rate. As long as individual frames overlap, the present system is immune to radial movement. However, since subject 20 may be directed to take a certain position as a steady subject, the radial movement 55 would not necessarily be a factor relative to attaining an in-focus image, particularly since the exposure time of camera 16 would be about one to two milliseconds. If there is to be a concern, the exposure time $T_E$ may be shortened to avoid effects of movement. The lateral movement 54 or radial movement 55 would not necessarily exceed the depth of field of the optics assembly 11 for a given focus.

Figure 8:
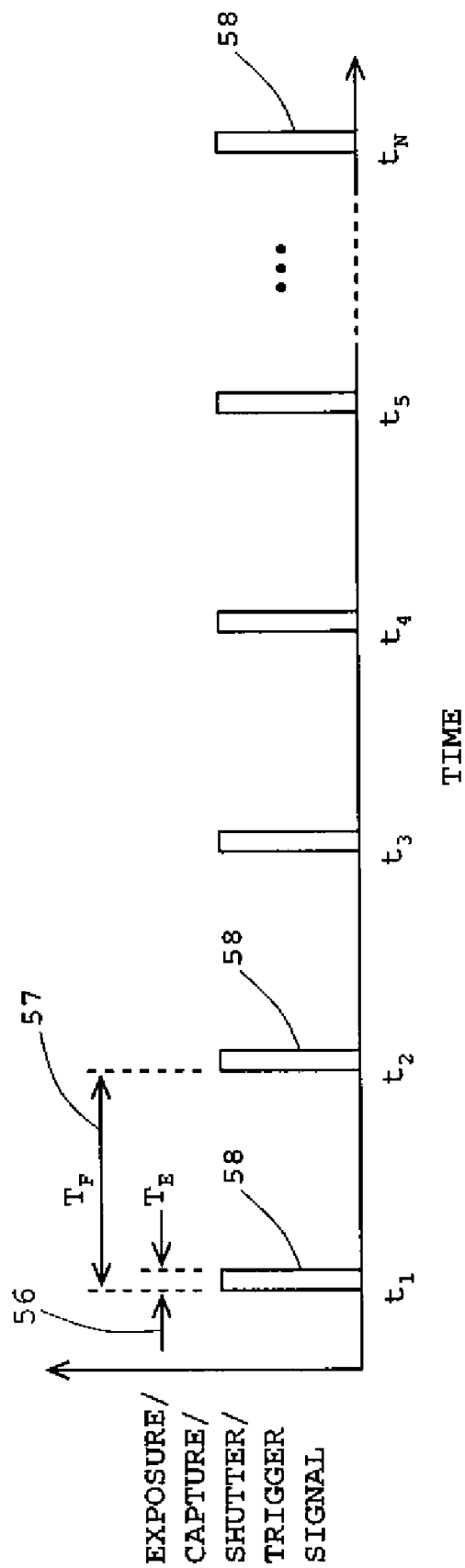
FIG. 8 is a graph of capture/shutter trigger signal versus time for exposures and frames of images.

FIG. 8 is a diagram showing a relationship of exposure time $T_E$ 56 and a frame period $T_F$ 57. A shutter, exposure, capture or trigger signal may be indicated by a pulse 58 where there is an exposure time 56 of the subject 20 on image array 27 of camera 16. Time $t_1$ may begin when the exposure time $T_E$ starts at the rising edge or beginning of pulse 58. The exposure time $T_E$ ends at the falling edge or end of the pulse 58. The next exposure time $T_E$ may begin at the end of $t_1$ and the start of pulse 58 at $t_2$. The same may occur for each time $t_3, t_4, t_5$, and so on, until pulse 58 at $t_N$, where N is the total number of pulses.

The depth of field of the optics 11 may, for one example, be about 10 mm. That the subject 20 moves forward, for instance, or that a focus that moves forward at a velocity $V_F$, may be a factor to consider. $\Delta d$ may be regarded as a depth of field. The formula $T_F \leq \Delta d/V_F$ should apply. If $T_F$ is much shorter than $\Delta d/V_F$, then there may be a waste of resources. If $T_F$ is longer than $\Delta d/V_F$, then the system may be unworkable because of gaps in focus coverage. Thus, in the present illustrative example, for still subjects, $T_F$ may be a period of up to 10 ms where the velocity $V_F$ approaches 1 meter/sec. The exposure time may be relatively much shorter such as about one to two milliseconds. Focusing distance would sweep 0.2 m during which the actual subject distance $d_s$ is within the depth of field of at least one frame. A sequence of images may be taken and processing relating to them may generally be done later or could be done in real-time. The processing may take only several seconds; however, this time is large relative to 10 milliseconds multiplied by the number of exposures. For 20 images, the time would be 200 milliseconds for the total image acquisition. A goal is to have at least one frame in the depth of field of the subject. This approach may permit a high frame rate (e.g., 100 frames per second) of image acquisition.

The above numbers may assume that the relative velocity $|v_f-v_s|=1$ m/s. If this is the case, the system may be at its maximum speed and the 20 images will provide no difference overlap. For smaller relative velocities, there may be an overlap. The smaller the relative velocity, the larger may be the overlap.

Figure 9:
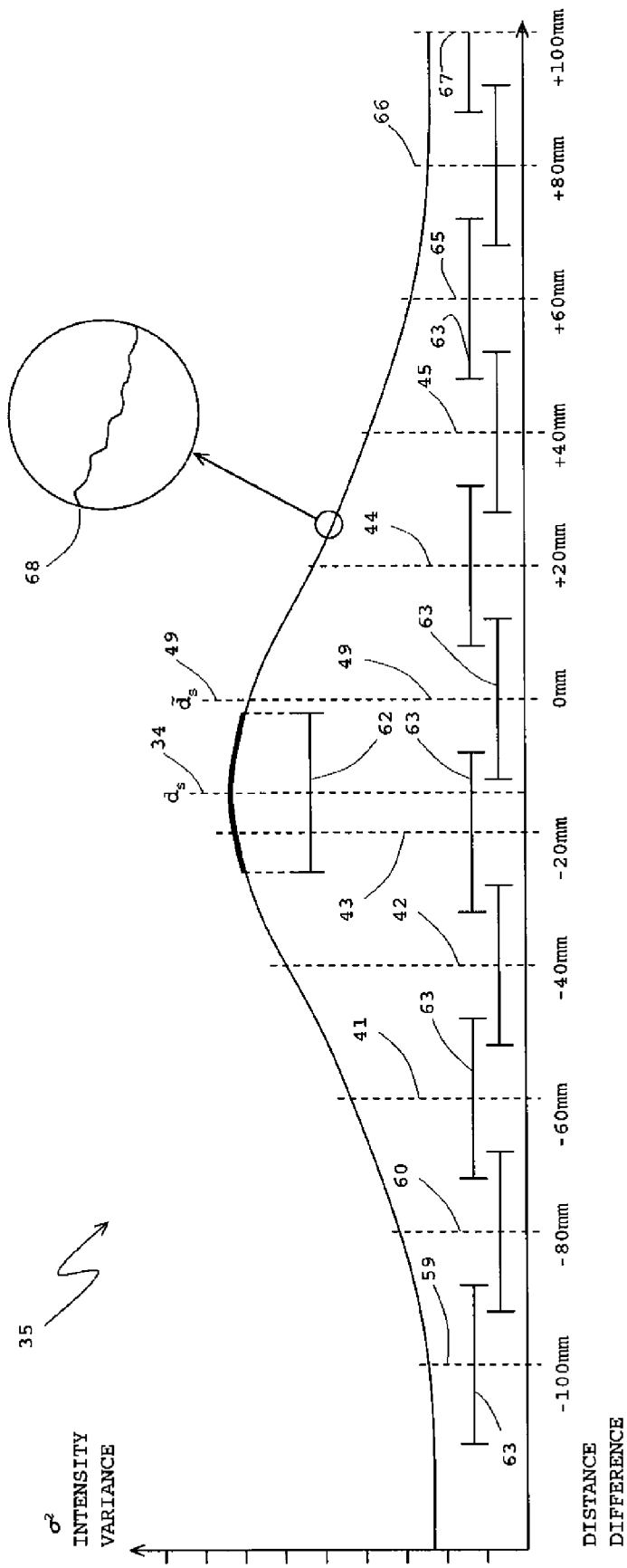
FIG. 9 is a graph of intensity variance versus focus distance for captured images.

FIG. 9 is a graph of intensity variance as a function of distance difference. There may be an actual in-focus point at distance 34 and an estimate in-focus point at distance 49. Distance 62 may represent an increment of the difference depth of focus at distance 34 which, as an illustrative example, may be about 25 mm. Other depths of focus 63, at and relative to distance 49, may be chosen to be about 25 millimeters and the timing of image capture can be such that the images may have about a 5 millimeter or so depth of focus overlap with adjacent depths of focus 63. That means a depth of focus 63 may extend about 12.5 mm on each side of its center. The depths of focus 63 may overlap other depths of focus 63 relative to 20 mm increments of distance difference throughout about a 200 mm portion shown in graph 35. The focus change may sweep forward (left to right) or backwards (right to left) on the graph. The example noted herein may be a sweep forward version. Thus, the focusing distance adjustment beginning at $t_1$ may be designated as $d_F(t_1)=\tilde{d}_s-100$ mm at line 59 and ending at $t_N$ may be designated as $d_F(t_N)=\tilde{d}_s+100$ mm at line 67, as noted relative to FIG. 5. $T_F$ may equal 20 ms. So, one may have an image acquired a −100 mm, −80 mm, −60 mm, −40 mm, −20 mm, 0 mm, +20 mm, +40 mm, +60 mm, +80 mm, +100 mm, 11 images in total, at lines 59, 60, 41, 42, 43, 49, 44, 45, 65, 66 and 67, respectively, and so on, relative to the estimated focus distance $\tilde{d}_s$ 49. This setup may be performed under an assumption of a focus velocity being about one meter per second. As long as the focus distance estimate is within 100 mm of the depth of field 62 of the actual focus distance, then there should be at least one image taken within the depth of field of focus of the subject. Also, as long as $T_F$ is less than or equal to the depth of focus $\Delta d$ divided by $V_F$, then an image of the subject within the depth of field 62 of focus should be acquirable. For example, it may be that the estimated distance of focus is at line 49, which can turn out to be, for instance, about 15 mm closer to lens 12 of the camera than the actual distance 34 of focus from subject 20, which may be from contrast analysis processing of the images for selecting the image which is in the best focus. The distances as represented in FIG. 9 are for illustrative purposes and not necessarily drawn to scale.

Figure 10:
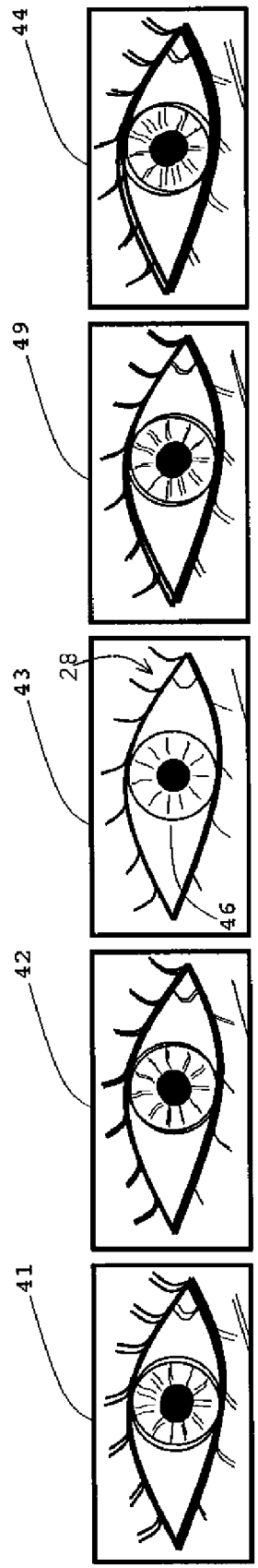
FIG. 10 is a diagram simulating some of the captured images of an eye of a subject at various focus distances shown in the graph of FIG. 9.

The curves of graph 35 are not necessarily smooth, due to sensor noise and window location uncertainty image discretization, as indicated by an example magnification 68. The lens 12 focus may be set, for instance, at infinity to start and to its closest focus to end, and then be changed through its focus range as a sequence of images of the subject 20 is captured during the change of focus. For illustrative purposes, five images at focus distances 41, 42, 43, 49 and 44 of the right eye may be captured. Incidentally, just three images might be sufficient. Images at the distances 41, 42, 43, 49 and 44 as designated by the lines may be regarded as images 41, 42, 43, 49 and 44, respectively. These images may be a cropped image 31 of image 29 from FIG. 3 taken at various focus distances. Images 41, 42, 49 and 44, as shown in FIG. 10, may be regarded as out of focus as indicated by blurriness, poor clarity, low contrast, a lack of information discernable in iris 46, and so forth in view of image 43, to an observer. However, mechanisms are available to indicate quality of focus. From left to right of the images, as the focus changes as the focus distance is changed, iris 46 details or information appears to be most unambiguous and discernable, and thus best focused in image 43. However, the best focus of the image 43 may be machine evaluated within system 10 via an aspect of computer 30 in view of the intensity variance/contrast and to be detected before a human eye sees it.

Specifically, graph 35 shows the intensity variance increasing as the focus is improving for the sequence of lines 41 through 43. At lines 49 and 44 the focus appears to degrade as the intensity variance decreases. It may be noted that the best focus may be at line 43 which appears within the depth of field 62 at the peak of the intensity variance of graph 35, which coincides with the capturing of image 43 within the depth of field 62.

Figure 11:
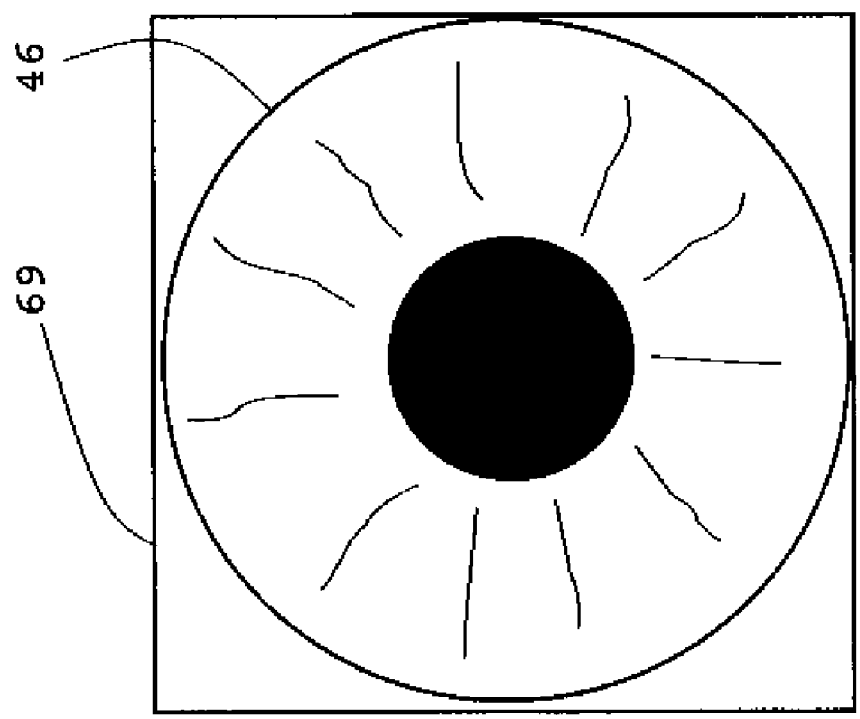
FIG. 11 is a diagram of an iris image cropped from a focused image in FIG. 10.

FIG. 11 is a diagram of an iris 46 image 69 cropped from the focused captured image 43 in FIG. 10. This iris image 69 may be available for analysis, storage, matching, and so forth.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A standoff image acquisition system comprising:
an image sensor;
an optics assembly coupled to the image sensor; and
a processor coupled to the image sensor and the optics assembly;
wherein:
the optics assembly is configured to convey images of a subject suitable for biometric imaging to the image sensor with a varying focus distance while the standoff image acquisition system is disposed at a standoff distance from the subject; and
the processor is programmed to control the image sensor to acquire a sequence of images from the optics assembly of the subject and control the optics assembly to vary the focus distance monotonically during acquisition of the sequence of images.

2. The system of claim 1, wherein at least one image of the sequence of images acquired comprises a window within the at least one images enclosing a biometric target on the subject, the window enclosing an area of the image substantially less than the total area of the image.

3. The system of claim 1, wherein the focus distance of the optics assembly is varied in a continuous manner during the conveying of images.

4. The system of claim 1, the focus distance of the optics assembly is varied in a discrete manner during the conveying of images.

5. The system of claim 1, wherein:
the processor is programmed to determine a best focused image based on spatial frequency content relative to that of other images in the sequence of images; and
the sequence of images is acquired at a frame rate independent of the rate at which the processor processes the images for determining a best focused image in the sequence of images.

6. The system of claim 1, wherein:
a frame period between exposures for images is less than or equal to a depth of field of focus divided by focus velocity; and
the focus velocity is a change in focus distance relative to the optics assembly per unit time.

7. The system of claim 1, wherein:
the image sensor is for capturing infrared images; and
an exposure time of the image sensor for an image is equivalent to a duration of illumination of an infrared illuminator.

8. The system of claim 1, further comprising:
a shutter; and
wherein:
the shutter of the image sensor is electronic; and
an exposure time of the image sensor for an image is less than 100 milliseconds.

9. The system of claim 1, wherein:
an estimate of an in-focus distance of the subject is provided to the optics assembly; and
the focus of the optics assembly is set to vary between a first distance behind and a second distance in front of the estimate of the in-focus distance.

10. A method for iris image acquisition comprising:
providing a sensor for capturing images;
conveying a plurality of images with a lens onto the sensor;
varying a focus with the lens of at least two of the plurality of images;
selecting an image from at least two of the plurality of images having a sufficient focus on a subject; and
providing a window within at least one of the plurality of images to capture an eye target on the subject, wherein the window encloses an area of the at least one of the plurality of images substantially less than the total area of the image.

11. The method of claim 10, wherein:
a rate of processing images is independent of a rate of capturing;
processing images comprises selecting an image out of at least two images of the plurality of images, as having a good focus.

12. The method of claim 10, wherein capturing images comprises providing an illuminator flash for freezing motion of a subject of the images.

13. The method of claim 11, wherein:
an item of the images is at least a portion of a person; and
the sufficient focus is of the iris target within the window in the at least one of the plurality of images.

14. An iris image acquisition system comprising:
a camera configured to acquire a plurality of images; and
a variable focus mechanism coupled to the camera, the variable focus mechanism configured to vary, during the acquisition of the plurality of images, a focus distance of the images;
wherein:
$T_F \leq \Delta D / V_F$;
$\Delta D$ is a depth of field of focus;
$V_F$ is a velocity at which the focus distance changes during the acquisition of the plurality of images; and
$T_F$ is a frame time between acquisitions of images of the plurality of images.

15. The system of claim 14, wherein:
an estimate of a correct focus distance is determined;
the focus mechanism is set at the estimated focus distance offset by a first distance;
during acquisition of the plurality of images, the focus mechanism is varied from the estimated focus distance plus the first distance to the estimated focus distance minus a second distance; and
the first and second distances are either plus or minus distances.

16. The system of claim 15, wherein during or after the acquisition of the plurality of images, an image having a sufficient focus is selected from the images.

17. The system of claim 16, wherein an image having the sufficient focus is selected according to an image intensity variance of the image.

18. The system of claim 14, wherein:
the images comprise an area of interest on a subject; and
a field of view of the camera is sufficiently larger than that of the area of interest to minimize pointing of the camera to capture an image that includes the area of interest; and
wherein the area of interest is delineated by a window in the image.

19. The system of claim 18, wherein the area of interest comprises an eye and/or an iris.

* * * * *